Oct. 30, 1923.
W. R. BAILIE
HEAD YOKE
Filed April 11, 1923
1,472,541
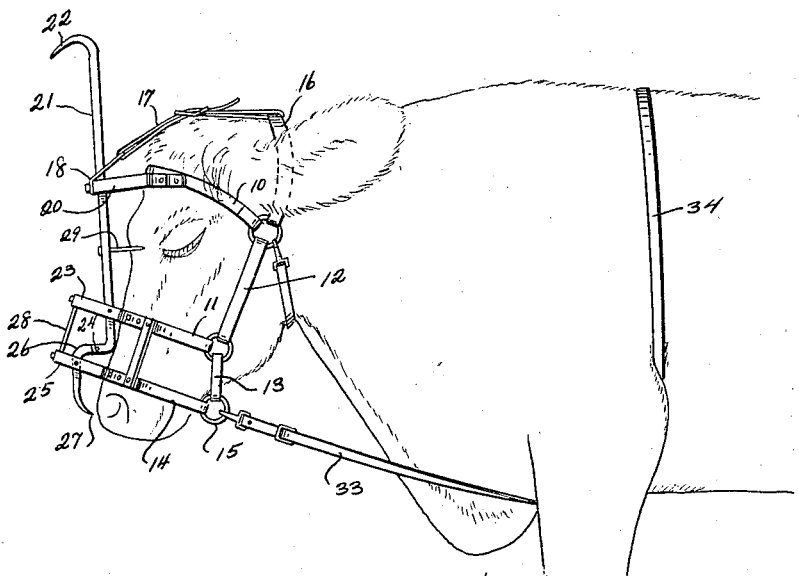
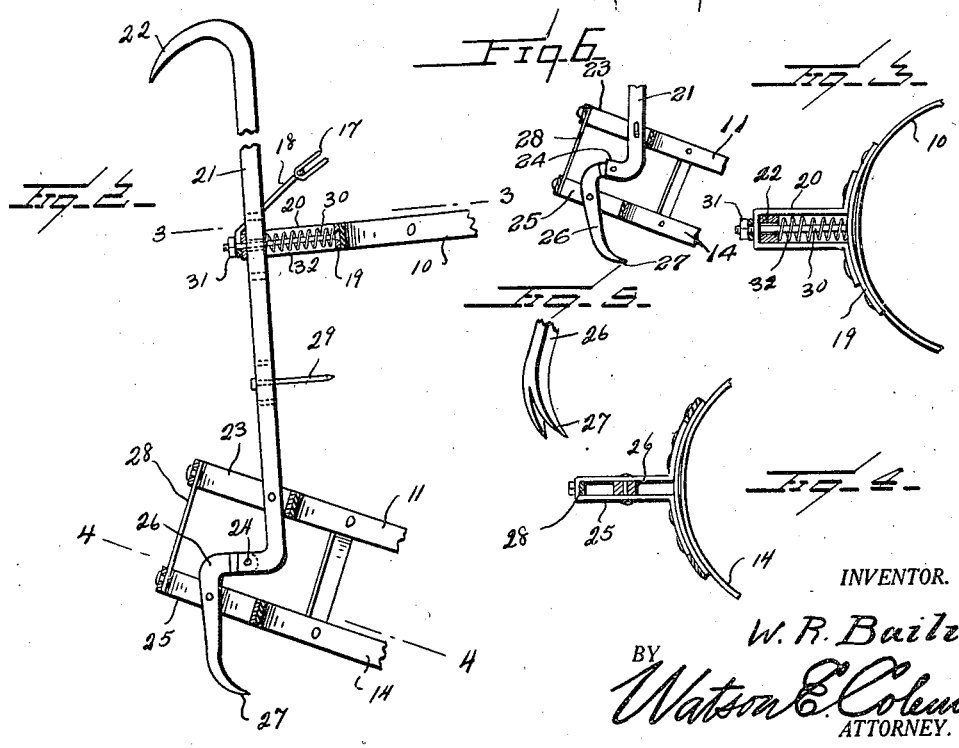
INVENTOR.
W. R. Bailie
BY Watson E. Coleman
ATTORNEY.

Patented Oct. 30, 1923.

1,472,541

UNITED STATES PATENT OFFICE.

WILLIAM R. BAILIE, OF MESA, WASHINGTON.

HEAD YOKE.

Application filed April 11, 1923. Serial No. 631,430.

*To all whom it may concern:*

Be it known that I, WILLIAM R. BAILIE, a citizen of the United States, residing at Mesa, in the county of Franklin and State of Washington, have invented certain new and useful Improvements in Head Yokes, of which the following is a specification, reference being had to the accompanying drawings.

This invention relates to means for preventing cattle from butting down, tearing up or otherwise breaking through fences, and particularly to a device adapted to be mounted upon a head stall on the animal which will act to hurt the animal in case it attempts to pass through a fence.

The general object of the invention is to provide a device of this character which is very simple and which is so arranged that if the cow attempts to pass through, break down or tear up a fence, one or more sharp pointed members will be forced into the face of the cow.

A further object is to provide a construction of this character which is so arranged that it will permit a cow to feed without inconvenience or pain but which is so constructed that if the cow attempts to get through a wire fence, for instance, a pointed member will be forced into the face of the cow between the eyes and a second pointed member will be forced into the relatively sensitive nose of the cow between the nostrils.

A still further object is to provide means whereby the device will be caused to operate if the cow attempts to slip her head in between the wires of a fence and thus crawl through.

Other advantages of the device will appear in the following description.

My invention is illustrated in the accompanying drawings, wherein:—

Figure 1 is a side elevation of my head yoke showing it in applied position;

Figure 2 is a fragmentary enlarged elevation partly in section of the head yoke;

Figure 3 is a section on the line 3—3 of Figure 2;

Figure 4 is a section on the line 4—4 of Figure 2;

Figure 5 is a detail perspective view of the pronged end of the lever 26;

Figure 6 is a fragmentary enlarged elevation of the levers 21 and 20 to show the manner in which the levers are pivoted to each other.

In these drawings, I have illustrated a head stall or halter adapted to be placed upon the head of a cow or other animal. While I have illustrated this device as being applied to a cow, it will be understood that it might be applied to any animal by slightly varying the form of the head stall. The head stall comprises the brow band 10, the nose band 11 connected by cheek pieces 12 to the brow band, a chin strap 13, and the band 14 which passes around the muzzle of the animal and with which rings 15 are connected. Extending behind the ears and connected to the ends of the brow band 10 is a band 16 which is connected by a strap 17, which has connected to it an elongated loop or ring 18.

Mounted upon the band 10 is a metallic strap 19, and riveted to this strap is an approximately U-shaped yoke 20. Disposed through this yoke is a vertically extending lever 21, which at its upper end is formed with a hook 22. The lower end of this lever passes through and is pivoted to a yoke 23 riveted or otherwise mounted upon the nose band 11. The lower extremity of this lever is angularly bent and bifurcated at 24 and pivotally mounted in a U-shaped yoke 25 which is secured to the band 14 is a lever 26, the lower end of which is turned downward and inward and formed with two sharp pointed prongs 27 which, when the device is in place, are disposed adjacent to the nose of the cow and between the nostrils thereof. The yokes 23 and 25 are connected by means of a bridge piece 28 which shields the upper end of the lever 26 and the lower end of the lever 21 from accidental actuation. The end of the lever 21 is pivoted to the upper end of the lever 28 below the fulcrum for the lever in yoke 23. The lever 21 is provided with an inwardly projecting sharp pointed pin 29.

The yoke 20 has disposed within it a bolt 30 extending from the plate 19, which pin passes through the lever 21 and carries a nut 31. A coiled spring 32 is disposed within the yoke, bearing against the member 19 and forcing the upper end of the lever outward. The forcing of the upper end of the lever outward causes the retraction of the pin 29 and of the prongs 27, while if the lever 21 be forced inward the point 29 will be forced into the face of the animal, while the prongs 27 will be forced in between the nostrils. Preferably a strap 33 is attached to the ring 15 and extends between the forelegs of the animal and is attached to a belly band 34 or surcingle and surrounds the body of the cow just rearward of the front legs. Preferably the elongated loop on the end of the strap 17 loosely engages the pin 30 and is held in place by the nut 31 so as to prevent any movement of the head stall around the head of the animal.

With this construction it is obvious that if the animal attempts to pass through a fence and break it down as, for instance, a wire fence, the hook 22 will catch upon the wires of the fence and will be forced rearward against the action of the spring 32 and this will force the point 29 into the cow's face and also force the prongs into her nose. If the cow attempts to butt down a fence the same thing will occur, as the contact of the fence with any portion of the lever 21 above the pivotal point thereof will cause the prongs to be forced into the cow's face. The shield extending over the adjacent pivoted ends of the levers 21 and 26 will prevent anything from striking the lower end of the lever 21 or the upper end of the lever 26 when the cow is attempting to break down a fence. The strap 33 with the belly band 34 acts when the head of the animal is drawn upward to hold the halter taut and thus dispose the hook 22 in better position to catch upon the wire. This strap 33 with the belly band 34 prevents the animal from turning the head sidewise and thus passing through between adjacent strands of a wire fence.

While I have described this invention as used for cows, calves and bulls, it is also perfectly adapted for use on horses, mules or other animals, but where it is used for a mule or horse the lower lever 26 is removed or disused for the reason that the nose of the horse or mule between the nostrils is very tender and these prongs 27 sticking into the tender flesh of the nostril would be liable to injure the horse or mule. Of course, in this case the prong or pin 29 is forced into the flesh between the eyes and accomplishes the desired result.

I claim:—

1. A device of the character described comprising a head stall adapted to be applied upon the head of an animal, a U-shaped yoke applied to the head stall adjacent its lower end, a lever pivoted in said yoke and extending vertically upward therefrom, the upper end of the lever being formed with a forwardly extending hook, a second yoke mounted upon the head stall adjacent its upper end and through which said lever loosely passes, a spring mounted within the second yoke and forcing the upper end of the lever outward, a pin carried upon this lever above its pivot and projecting inward, a third yoke mounted upon the lower end of the head stall, and a lever pivoted within this third yoke operatively engaged with the lower end of the first named lever, the lower end of the second named lever being formed with an inwardly projecting prong.

2. A device of the character described comprising a head stall having a brow band, a nose band, a band surrounding the muzzle of the animal, cheek straps, a neck band, and a head band passing behind the ears, of a U-shaped yoke mounted upon the nose band at the front thereof, a lever pivoted in said yoke and extending vertically upward, a second yoke mounted upon the brow band through which the lever passes, a spring mounted within the second named yoke and urging the upper end of the lever outward, the upper end of the lever being formed with a forwardly curved hook and that portion of the lever between the first and second named yokes having an inwardly projecting pin, a third yoke mounted upon the muzzle band below the second named yoke, a lever mounted within said last named yoke and having prongs at its lower end, the upper end of the lever being inwardly turned and pivotally engaged with the lower end of the first named lever, and a connection from the head band to the brow band.

3. A device of the character described comprising a head stall having a brow band, a nose band, a band surrounding the muzzle of the animal, cheek straps, a neck band, and a head band passing behind the ears, of a U-shaped yoke mounted upon the nose band at the front thereof, a lever pivoted in said yoke and extending vertically upward, a second yoke mounted upon the brow band through which the lever passes, a spring mounted within the second named yoke and urging the upper end of the lever outward, the upper end of the lever being formed with a forwardly curved hook and that portion of the lever between the first and second named yoke having an inwardly projecting pin, a third yoke mounted upon the muzzle band below the second named yoke, a lever mounted within said last named yoke and having prongs at its lower end, the upper end of the lever being inwardly turned and pivotally engaged with the lower end of the first named lever, a connection from the head band to the brow band, a surcingle adapted to pass around the body of the cow, and a check strap attached to the surcingle and adapted to pass between the legs of the animal and engage the lower ends of the head stall.

In testimony whereof I hereunto affix my signature.

WILLIAM R. BAILIE.